United States Patent [19]
Fox et al.

[11] 4,091,503
[45] May 30, 1978

[54] NECK-BREAKING AND STRETCHING APPARATUS FOR POULTRY

[75] Inventors: Gaston M. Fox, Albany; Thomas H. Wright, Gainesville, both of Ga.

[73] Assignee: Barker International, Inc., Marietta, Ga.

[21] Appl. No.: 750,571

[22] Filed: Dec. 14, 1976

[51] Int. Cl.² .............................................. A22C 21/00
[52] U.S. Cl. .......................................... 17/11; 17/52
[58] Field of Search ........................... 17/11, 45, 52

[56] References Cited

U.S. PATENT DOCUMENTS

| | | | |
|---|---|---|---|
| Re. 28,666 | 12/1975 | Harben, Jr. | 17/11 |
| 2,846,718 | 8/1958 | Sengelaub et al. | 17/11 |
| 2,957,198 | 10/1960 | Cianciolo et al. | 17/11 |
| 3,056,161 | 10/1962 | Zebarth | 17/11 |
| 3,213,488 | 10/1965 | Volpe | 17/11 |
| 3,277,514 | 10/1966 | Hooley | 17/11 |
| 3,364,515 | 1/1968 | Brown | 17/11 |
| 3,405,623 | 10/1968 | Vertegaal | 17/11 |
| 3,490,092 | 1/1970 | Harrison | 17/11 |
| 3,510,907 | 5/1970 | Rejsa et al. | 17/11 |
| 3,522,622 | 8/1970 | Crane | 17/11 |
| 3,522,623 | 8/1970 | Pyron | 17/11 |
| 3,548,448 | 12/1970 | Vertegaal | 17/11 |
| 3,555,593 | 1/1971 | Scheier | 17/11 |
| 3,653,093 | 4/1972 | Scheier | 17/11 |
| 3,744,087 | 7/1973 | Vertegaal | 17/11 |
| 3,755,854 | 9/1973 | Van Mil | 17/11 |
| 3,798,708 | 3/1974 | Scheier | 17/52 |
| 3,802,028 | 4/1974 | Scheier et al. | 17/11 |
| 3,965,534 | 6/1976 | Harben, Jr. | 17/11 |
| 3,979,793 | 9/1976 | Hazenbrock | 17/11 |

*Primary Examiner*—Louis G. Mancene
*Assistant Examiner*—Paul J. Hirsch
*Attorney, Agent, or Firm*—Price, Heneveld, Huizenga & Cooper

[57] ABSTRACT

Apparatus and method for processing poultry and other fowl for removal of the windpipe, esophagus and crop from the neck of the fowl. Fowl suspended with their necks hanging down are moved on an overhead conveyor in synchronism with a rotating holding and positioning carriage. A cutting blade is rotated in synchronism with the holding and positioning carriage against the back of the fowl neck to cut an incision to a controlled depth and to break the neck bone. The neck is then stretched by engagement with a stationary stretching member while the cutting blade remains engaged with the neck of the moving fowl to open the incision and separate the neck bone to allow access to the windpipe, esophagus and crop. The method includes cutting an incision to a controlled depth in the neck of a fowl and breaking the neck bone, and stretching the neck with a stationary stretching member to open the incision and separate the neck bone while moving the fowl along a predetermined path.

38 Claims, 5 Drawing Figures

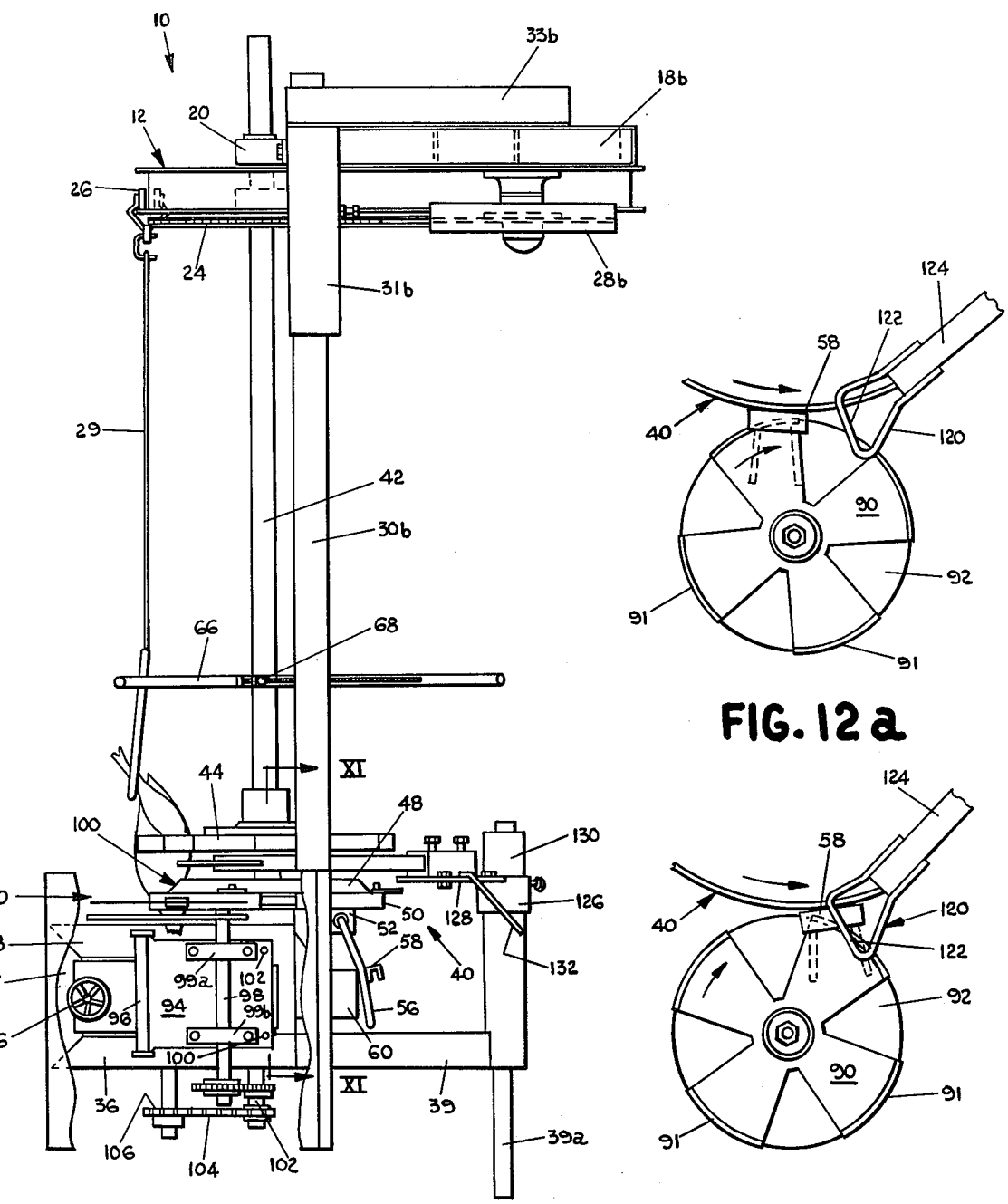

NECK-BREAKING AND STRETCHING APPARATUS FOR POULTRY

BACKGROUND OF THE INVENTION

This invention relates to a poultry processing apparatus and method and, more particularly, to an apparatus and method for cutting the neck of a fowl and breaking the neck bone of the fowl to prepare it for withdrawal of its windpipe, esophagus and crop.

In poultry processing, it is necessary to remove the windpipe, esophagus and crop of the fowl before severance of the neck. This process is accomplished by cutting the neck of the bird from the rear side to a controlled depth while breaking the neck vertebra thereby providing access to the windpipe, esophagus and crop. The incision is typically not made from the front or throat area so as to avoid cutting the windpipe, esophagus or crop. The cutting and neck bone breaking is often performed manually by workers standing adjacent a conveyor line in a poultry processing plant. Such cutting is time consuming, and therefore expensive, because of the manual labor involved. The manual method is also tedious, requiring careful attention so that the neck vertebra are sufficiently separated to allow sufficient access to the above parts.

Various machines have been proposed to mechanize the above process. One such machine is that disclosed in U.S. Pat. No. 3,965,534 entitled Poultry Neck Breaking Machine. In that machine, fowl suspended with their necks down are moved into alignment with a movable, rectilinear carriage including a series of movable guide bars. The entire carriage is rotated vertically in an orbital path from beneath the bird and the bars moved to clamp the hanging necks. Thereafter, cutting blades are reciprocated against the necks of the birds by fluid cylinders. The carriage is then lowered in its orbital path with the guide bars remaining in clamping engagement with the necks to stretch the necks downwardly while the cutting means are withdrawn.

The above-described machine operates by moving its various parts generally reciprocally with respect to the path of the moving fowl on the poultry processing conveyor line. The machine also requires a large number of moving parts all of which must be coordinated in their movement to the reciprocating motion of the machine.

The present invention is an improvement over the above-described and other neck-breaking machines and is designed for smooth, continuous, synchronized operation which cooperates with the motion of the fowl suspended on and moved along a poultry processing conveyor line.

SUMMARY OF THE INVENTION

Accordingly, the present invention provides poultry processing apparatus and method for cutting and breaking the necks of fowl to prepare them for withdrawal of their windpipes, esophaguses, and crops through incisions in the necks of the fowl.

In one aspect, the apparatus includes movable support means for suspending at least one fowl in an inverted position with its neck down. Movable cutting and holding means positioned adjacent to the movable support means are synchronized with those support means for cutting an incision partially through the neck of a fowl to a controlled depth and breaking the bone in the neck. Stationary stretching means positioned adjacent the cutting and holding means engage, stretch and open the incision and separate the neck bone to provide access to the above parts of the bird through the incision.

In another aspect, the apparatus includes holding means for positioning and restraining at least the neck of a fowl and rotary cutting means including a rotary cutting blade positioned in opposition to those holding means for controlled cutting of an incision partially through the fowl neck and for breaking the bone in the neck. Synchronized means are included for moving the holding means in a predetermined path and for rotating the cutting means in registry with and in close proximity to at least a predetermined location on the holding means to prepare the fowl neck for removal of the windpipe, esophagus and crop through the incision.

The present invention also concerns a method for processing poultry and other fowl including cutting an incision to a controlled depth in the neck of a fowl and breaking the bone in the neck while positioning at least the neck of the fowl and moving the fowl along the predetermined path. Thereafter, the neck is stretched with a stationary stretching means to open the incision and separate the neck bone while continuing to move the fowl along the path whereby the fowl is prepared for withdrawal of the windpipe, esophagus and crop.

The above apparatus and method provide significant advantages over prior known manual and mechanized poultry, neck-cutting and breaking procedures. The invention utilizes the direction of motion of the fowl on the poultry processing conveyor line and cooperates without the necessity of opposing or reciprocating motion. The structure and method allow precise, controlled cutting of the neck and breaking of the neck vertebra with a blade rotating in the same direction of motion in which the birds are traveling. The problem of sufficient separation of the neck bone to allow withdrawal of the windpipe, esophagus and crop is overcome by the positive stretching of the neck after the cutting and breaking steps all while continuing to move the bird in the direction of motion of the poultry processing conveyor line. In the preferred embodiments, the apparatus utilizes rotating structures which are easily maintained, durable and long lasting, and avoid the vibration and break-downs normally encountered with reciprocating-type and other more complex machinery.

These and other objects, advantages, purposes and features of the invention will become more apparent from a study of the following description taken in conjunction with the drawings.

BRIEF DESCRIPTION OF THE DRAWINGS

FIG. 4 is a side elevation of the processing apparatus shown in FIGS. 1-3;

FIG. 12a is a fragmentary, plan view illustrating the positions of the holding, cutting and stretching means at the beginning of a cutting stroke; and FIG. 12b is a fragmentary, plan view of the holding, cutting and stretching means during the stretching portion of a cutting stroke.

DESCRIPTION OF THE PREFERRED EMBODIMENTS

Figure 1:
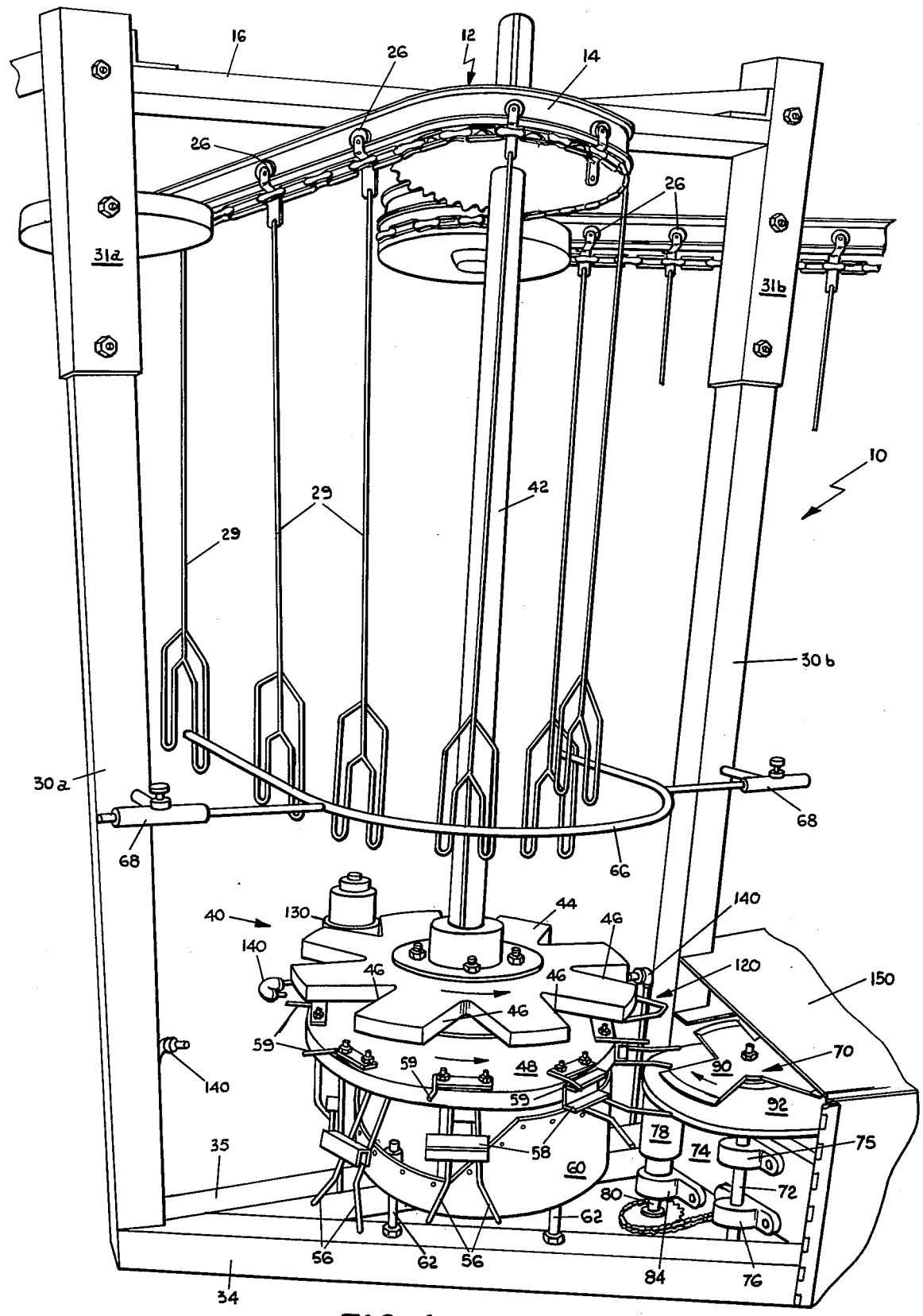
FIG. 1 is a front, perspective view of the poultry neck-cutting and breaking apparatus of the present invention installed along a poultry processing conveyor line.

Referring now to the drawings in greater detail, FIGS. 1-4 illustrate the poultry processing apparatus 10 of the present invention which is designed to be included along and form a part of an overhead conveyor poultry processing line 12. A rotating fowl holding and positioning carriage assembly 40 is positioned beneath a portion of the conveyor 12 while a rotating cutting blade assembly 70 is juxtaposed adjacent one location of the periphery of the carriage assembly 40. A stretching member 120 is positioned adjacent the cutting assembly 70 and the holding and positioning carriage 40 to stretch the neck of the fowl at the end of the cutting stroke of the cutting assembly.

As seen in FIGS. 1-4, the poultry processing overhead conveyor line 12 includes an I-beam conveyor track having a curved loop portion 14 (FIGS. 1 and 3) in the shape of a semicircle. A support beam 16 is secured transversely across the top of loop 14 and supports the ends of angular support beams 18a and 18b which extend from beam 16 to the tops of the conveyor track on either side of loop 14. A bearing pillow block 20 is secured to the front side of beam 16 and rotatably supports the main drive shaft 42 for the processing apparatus at its upper end. Fixedly keyed and secured to shaft 42 slightly below beam 16 and track loop 14 is a drive sprocket 22 having a diameter approximating that of loop 14 which engages an elongated, articulated, conveyor chain 24 secured to a plurality of spaced trolley wheel and bracket assemblies 26 movably supported on the I-beam track and extending therebelow. A pair of chain guide idler wheels 28a, 28b are rotatably supported below pairs of support beams 19a, 19b which in turn are supported between beams 18a, 18b and the top of the I-beam conveyor track at the rear corners of loop 14. Supported below spaced ones of the trolley assemblies 26 are elongated fowl support shackles 29 which suspend the fowl to be processed by the hocks of their legs such that their backs are facing the outside circumference of the circle portion defined by loop 14 with their necks hanging downwardly in registry with the holding and positioning carriage assembly 40. The heads of the fowl have typically been removed prior to the neck breaking and stretching operation.

A framework for supporting the remainder of the processing apparatus extends below and generally in vertical alignment with conveyor loop 14 and is primarily supported by beam 16 and, in turn, the overhead conveyor track. The conveyor track is supported in conventional manner from supports secured to the ceiling or the like. The framework includes a pair of vertically extending, parallel support columns 30a, 30b which are telescopically inserted in slightly larger tubes 31a, 31b secured vertically to the beam 16. Bolts 32 extend through tubes 31a, 31b and columns 30a, 30b to secure the columns and may be removed to raise or lower the columns to adjust the vertical position of the apparatus. The ends of beam 16 are further braced by lateral beams 33a, 33b extending over top of angular beams 18a, 18b, respectively.

Welded or otherwise secured to the bottom of vertical columns 30a, 30b is a rigid, triangular, horizontal frame formed by beams 34, 35 and 36 (FIGS. 1-4 and 7-10). A rectangular frame formed by beams 37, 38 along with column 30b in beam 36 extends outwardly from column 30b at the base or wide end of the triangular horizontal frame. This rectangular, vertically extending framework supports the shafts and adjustment mechanisms for the chain drive of the holding and positioning carriage 40 as well as cutting assembly 70. Beam 39 extends outwardly from the rear of the triangular framework (FIGS. 4, 7 and 8) and supports the stretching arm assembly as well as a stabilizing leg 39a. Leg 39a is the only contact between the apparatus framework and the supporting surface or floor beneath the overhead conveyor.

Figure 2:
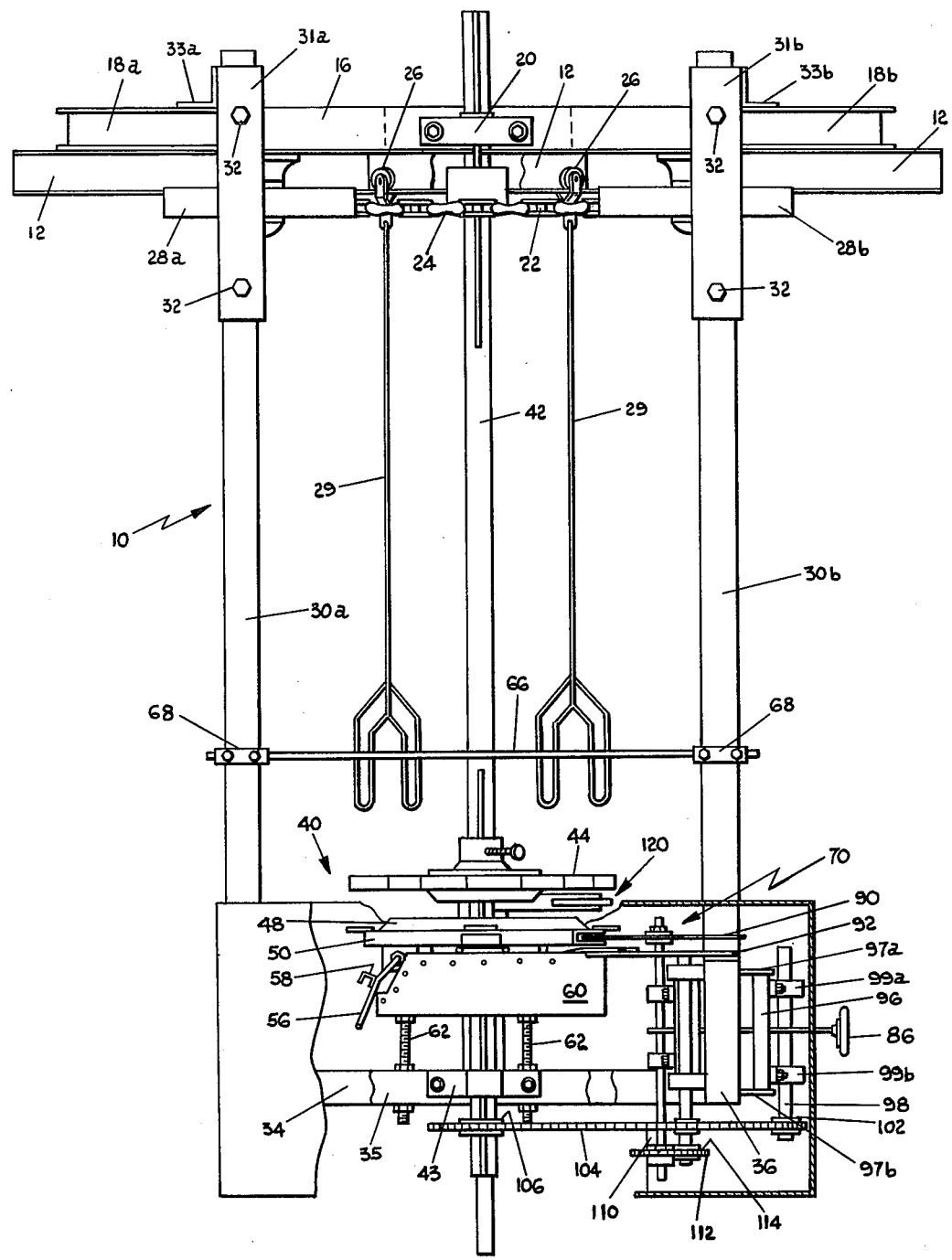
FIG. 2 is a front elevation of the processing apparatus shown in FIG. 1 with portions of the apparatus cover and supporting framework broken away to illustrate the internal mechanisms.
Figure 11:
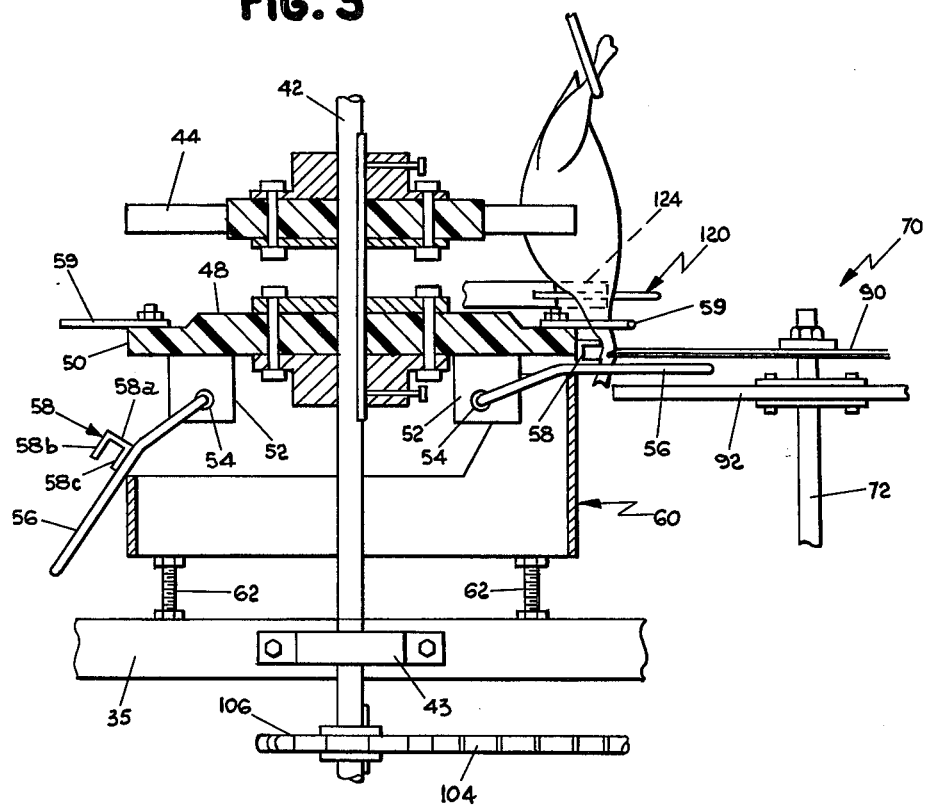
FIG. 11 is a fragmentary, sectional side elevation of the holding and positioning carriage and cutting apparatus.
Figures 5, 6:
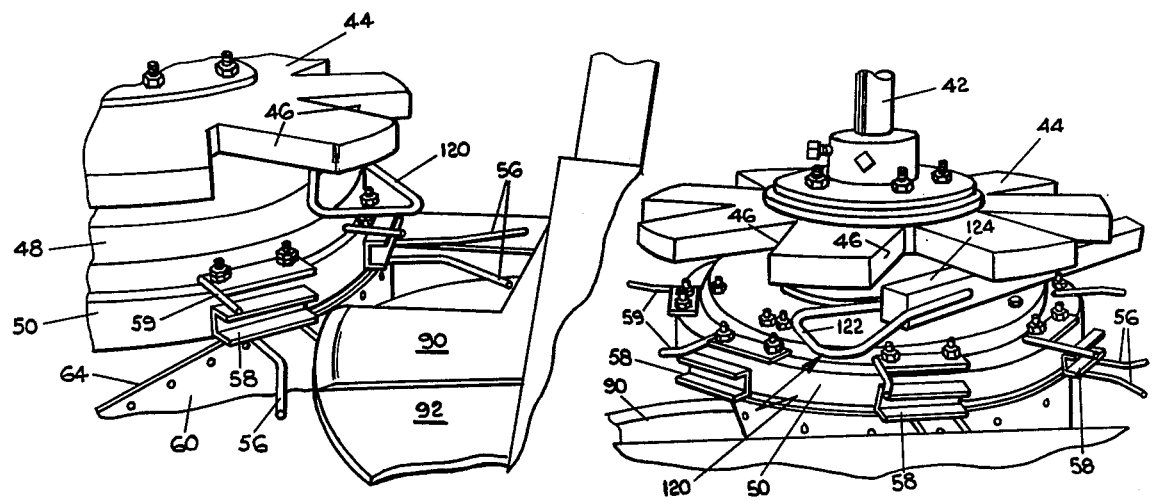
FIG. 5 is a fragmentary, perspective view of a portion of the processing apparatus illustrating the holding, cutting and stretching means.
FIG. 6 is a fragmentary, perspective view of the processing apparatus illustrating the holding, cutting and stretching means from an angle different from that in FIG. 5.

As is best seen in FIGS. 1, 2, 5-8 and 11, the holding and positioning carriage assembly 40 is primarily rotatably mounted on main shaft 42 which extends downwardly therethrough and is secured near its lower end by bearing pillow block 43 (FIGS. 2 and 11). Carriage assembly 40 includes an upper guide wheel or disc preferably formed from a rigid plastic or other lightweight, noncorrosive material and is secured and keyed in a fixed position to main shaft 42. Disc 44 is secured to shaft 42 via upper and lower plates bolted together through the disc with the entire assembly fixedly mounted to the shaft with set screws (FIG. 11). Disc 44 includes a plurality of V-shaped notches or recesses 46 spaced equally about the circumference of the wheel and extending radially inwardly for receiving a portion of the fowl body to guide, hold and restrain it in registry with other portions of the positioning means during the cutting and stretching operations. Each recess 46 is vertically aligned with one of the shackles 29.

Figures 7, 8:
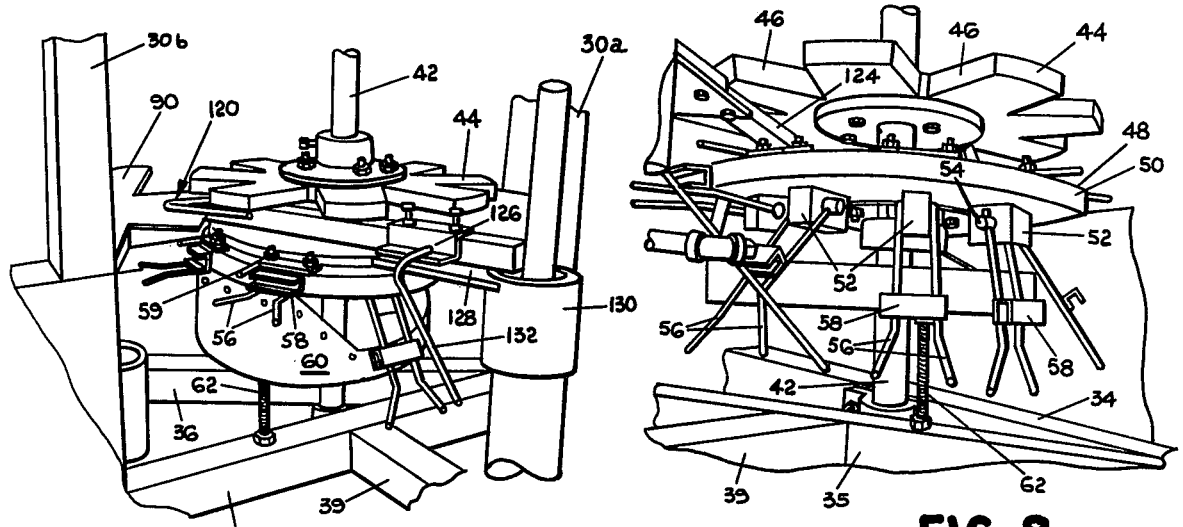
FIG. 7 is a fragmentary, rear perspective view of the processing apparatus including the holding, cutting and stretching means.
FIG. 8 is a fragmentary, rear perspective view taken from below a portion of the apparatus illustrating the positioning and restraining forks of the apparatus.
Figure 9:
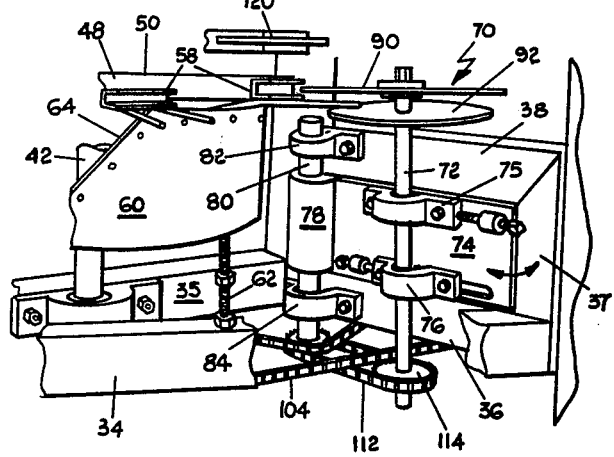
FIG. 9 is a fragmentary, front perspective view of the cutting portion of the apparatus illustrating the chain drive for that apparatus and the means for adjusting the position of the cutting blade.

Spaced below the upper guide wheel 44 is a lower neck-holding wheel 48 also fixedly secured and keyed to main shaft 42 in the same manner as disc 44 via a pair of plates bolted together through the wheel and secured to the shaft with set screws. Wheels 44, 48 can be adjusted vertically to accommodate various sized fowl with the described mounting structure. Disc or wheel 48 has a continuous, circular circumference 50 and is also formed from rigid plastic or another noncorrosive, lightweight material. A plurality of radially oriented, support blocks 52 extending downwardly from beneath the wheel at spaced locations on radii of the wheel (FIGS. 4, 8 and 11). Each of the support blocks 52 includes a cylindrical rod or axle 54 extending transversely therethrough generally tangentially to a circle concentric with main shaft 42. Each of the axles 54 supports a pair of outwardly extending prong rods 56 which are generally coplanar and spaced apart by the width of the blocks 52 to form a generally V-shaped retaining fork 55. Forks 55 are vertically pivotable on axles 54 generally in planes parallel to the radii of wheel 48 along which blocks 52 are secured. As is best seen in FIG. 11, rods 56 are bent intermediate their ends such that their free ends extend horizontally outwardly beyond circumference 50 of wheel 48 while the pivot axle 54 is located in a plane below that of the free ends of prongs 56.

Extending transversely across each pair of prongs is a generally channel-like neck support member or anvil 58 which is welded adjacent the bend in prongs 56. As shown in FIG. 11, the channel-like anvil includes a bottom or rear wall 58a and two parallel side flanges or walls 58b and 58c which define the channel opening into which the rotary cutting blade 90 will extend. Each anvil 58 is welded on a pair of prongs 56 such that its rear wall 58a engages and is supported by the circular circumference 50 of wheel 48 when the forks are in their raised position as shown in FIG. 11.

Mounted on the top surface of the wheel 48 at spaced positions around the edge of the wheel are a plurality of guide fingers 59 welded to plates which are bolted to the wheel adjacent the circumference 50. Fingers 59 extend beyond the wheel circumference and are in general vertical alignment with the prong 56 which is rearwardmost and trails the leading prong 56 in each fork 55. Fingers 59 provide guidance and restraint for the necks of the fowl into the V-shaped neck-receiving spaces between the prongs 56 as the holding and positioning carriage 40 rotates.

Figure 3:
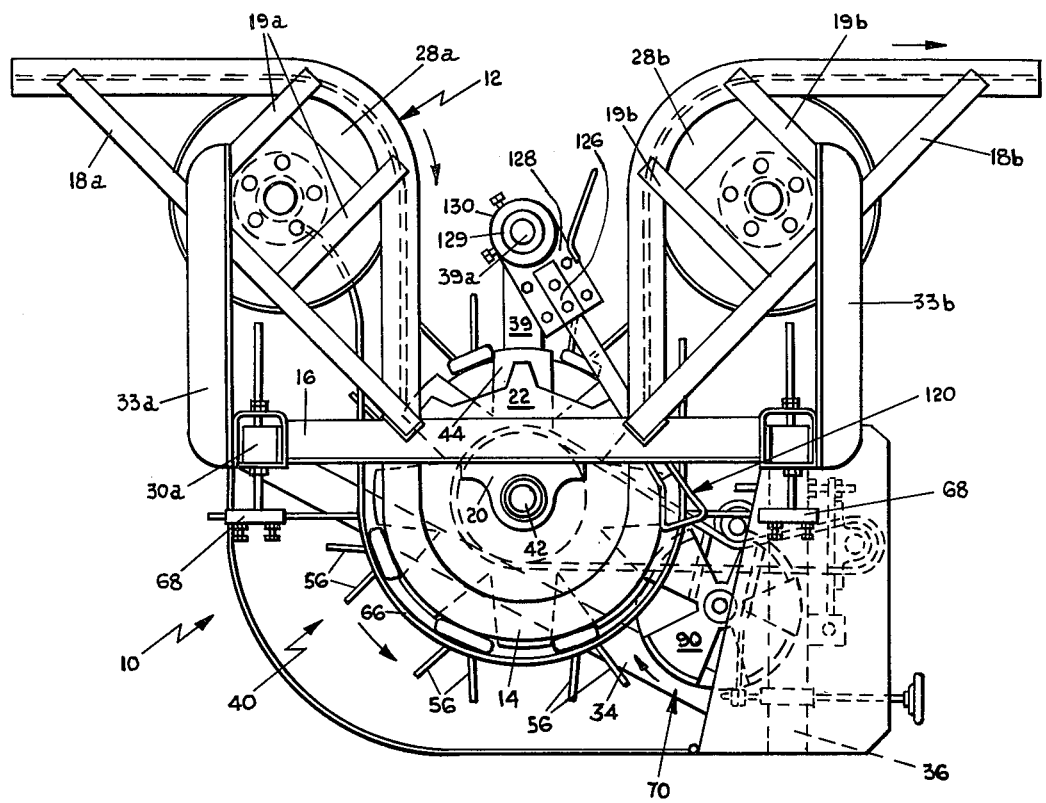
FIG. 3 is a plan view of the processing apparatus shown in FIGS. 1 and 2.

Positioned beneath the neck-holding wheel 48 is a generally cylindrical, rigid plastic cam 60 supported on adjustable legs 62 on frame beams 34, 35. Legs 62 are threaded and secure nuts which can be moved up or down to change the position of cam 60. Cam 60 has an upper surface 64 forming a cam track which is generally vertically aligned with the periphery of wheel 48 for raising and lowering the pivotable forks which rest thereagainst as the wheel 48 is rotated by central shaft 42. Cam track surface 64 is at a lower height such that prongs 56 project at a downward angle for the majority of the rotational path of carriage 40 except for the locale on either side of the area at which cutting blade 90 of the cutting assembly 70 rotates in close proximity with the periphery of the holding and positioning carriage 40. At either end of that locale, cam track surface 64 inclines upwardly to a raised level best seen in FIG. 11 and thereafter inclines downwardly to the lower level previously described. Hence, as wheel 48 is rotated, the forks are successively raised by the incline of cam track 64 to their raised position shown in FIG. 11. In the raised position, prongs 56 entrap the neck of a fowl guided therebetween by fingers 59 and the notches 46 of upper guide wheel 44 to hold and retain the neck in position for cutting and stretching as described hereinafter. For each fowl, one of the notches 46, one of the forks 55 and one of the fingers 59 are rotated in vertical registry so that the fowl is guided and maintained in its precise position during cutting and stretching. To facilitate such aligned rotation of the fowl, a shackle guide bar 66 is mounted between vertical columns 30a, 30b and is adjustable on adjustment brackets 68 (FIGS. 1 and 3). Brackets 68 include hollow cylinders 69a through which rectilinear support rods 69b, which are welded to bar 66, are telescoped to allow lateral sliding movement. Set screws 69c secure rods 69b, and thus bar 66, in place. Guide bar 66 is a rod formed in the shape of a semicircle having a diameter slightly larger than that of the semicircular overhead conveyor track 14 so as to guide the shackles (FIG. 4) and thus the suspended fowl, around the circular path followed by the rotating holding and positioning carriage assembly 40 described above.

Referring now to FIGS. 1–4, 9 and 10 especially, the rotating cutting assembly 70 includes a cutting shaft 72 vertically and rotatably mounted by bearing pillow blocks 75, 76 secured to a vertical support plate 74. Plate 74 is in turn rotatably secured intermediate the ends of a second vertical shaft 80 via a cylindrical housing 78. Bearings are secured at the ends of housing 78 to support shaft 80. Shaft 80 is in turn rotatably mounted in bearing pillow blocks 82, 84 which are secured in vertical alignment to the inside surface of support beams 36, 38. The horizontal position of the rotatable, vertically mounted plate 74 is controlled by a jack or adjusting screw 86 which extends through a plate 88 mounted to upright beam 37. Rotation of screw 86 pivots plate 74 about shaft 80 thereby changing the position of rotatable cutting shaft 72 as well as a generally circular cutting blade 90, fixedly secured to the upper end of cutting shaft 72, and a circular fowl-positioning disc 92. Disc 92 is preferably formed from rigid plastic and has a diameter slightly smaller than that of the cutting blade 90. Blade 90 is formed from hardened steel. Both blade 90 and disc 92 are fixedly secured and keyed to the shaft and are rotatable therewith.

On the opposite side of the vertically extending rectangular frame is secured a second vertical support plate 94 (FIG. 10) which is rotatably mounted on an axle 96 extending between brackets 97a, 97b. Yet another vertical shaft 98 is rotatably secured to the outer surface of plate 94 via bearing pillow blocks 99a, 99b. The position of plate 94 is adjusted using screws 100 which include nuts for securing plate 94 in a desired position. A sprocket 102 is mounted on the lower end of shaft 98 around which is fitted a drive chain 104 which extends around a large drive sprocket 106 fixedly keyed and secured adjacent the lower end of main shaft 42 (FIGS. 2, 4, and 11). Intermediate sprockets 102 and 106, drive chain 104 engages the periphery of a sprocket 108 mounted below pillow block 84 on shaft 80. Another sprocket 110 is mounted below sprocket 108 on shaft 80 and engages a second drive chain 112. Chain 112 in turn drives a sprocket 114 mounted adjacent the lower end of rotatable cutting shaft 72. Accordingly, rotation of main shaft 42 drives chain 104 which in turn drives sprocket 108 and shaft 80. In turn, sprocket 110 on shaft 80 drives chain 112 transferring rotational power in a direction opposite the direction of rotation of shaft 42 to cutting shaft 72 such that cutting blade 90 rotates in a direction opposite to that of holding and positioning carriage assembly 40. The rotational mounting of plates 74 and 94 allows the distance of the cutting edge of blade 90 to be adjusted with respect to the neck-support members 58 adjacent the circumference 50 of wheel 48 by rotation of jack screw 86. Likewise, adjustment of the nuts on screws 100 rotates plate 94 to tighten or loosen the drive chain 104.

Cutting blade 90 is a thin, hardened steel blade having arcuate, circular, separate, sharpened cutting edges 91

(FIGS. 12a and 12b) formed at the outer circumferential ends of separate cutting blade sections extending from a central blade section. Wedge-shaped portions are removed from between the separate blades to make each portion a distinct cutting section. Plate 74 is adjusted with screw 86 such that the cutting edges of blade 90 extend slightly past the end edges of the side flanges of anvil or neck-support members 58 as shown in FIGS. 12a and 12b. This provides a controlled cutting of the neck of the fowl as well as breaking of the neck vertebrae.

As shown in FIG. 11, blade 90 is positioned and rotates slightly above the prongs 56 of forks 55 in their raised position while the fowl positioning disc 92 rotates in unison with the cutting blade slightly below those prongs. Disc 92 engages and pushes out of the way the wings of the fowl which may be hanging down alongside the bird as it enters the cutting position. In addition, the separate cutting edges 91 allow the cutting blade 90 to engage and move laterally across the neck of a bird behind the leading wing as it is moved along the conveyor path and end cutting ahead of the trailing wing. Damage to the fowl wings is avoided.

The size of sprocket 108, which is driven by chain 104 in synchronism with the rotation of main shaft 42 and idler shaft 98, is chosen such that the cutting edges 91 of cutting blade 90 are rotated at a speed in the range of about two to three times the speed of conveyor 12 and the circumference of the holding and positioning carriage assembly 40 including guide wheel 44, neck-holding wheel 48, forks 55 and neck supports 58. Hence, each cutting edge 91 of blade 90 moves faster than the relative speed of the neck of the fowl being cut to provide a slitting action across the fowl neck ensuring a proper and efficient cutting of the fowl neck. In addition, the blade 90 is positioned on shaft 72 such that one of the separate blade sections rotates in registry with one of the forks 55 rotating with neck-holding wheel 48. Hence, a separate blade section is guided into engagement with the neck of a fowl positioned between prongs 56 and against the neck support member 58 while the bird is supported from the shackles 29.

Figure 10:
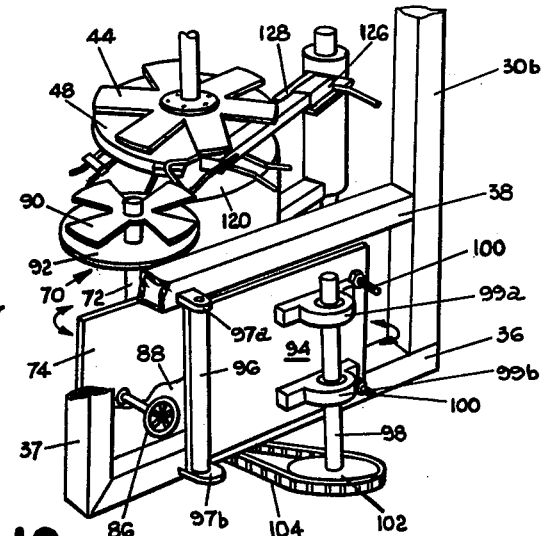
FIG. 10 is a fragmentary, perspective view illustrating the holding, cutting and stretching means the the means for adjusting the chain drive for the apparatus.

In order to properly stretch the neck of the fowl after the incision has been made by a blade section of cutting blade 90, a stationary stretching member 120 is positioned slightly above the cutting blade (FIG. 11), slightly below guide wheel 44, and in vertical alignment with the position of the fowl neck as the cutting stroke of one of the blade sections is being completed. Stretching member 120 is a rigid stainless steel loop having a rectilinear, neck-engaging portion 122 which extends transversely across the path of the bird as it is being cut and held between one of the cutting blade sections and the neck-support member 58. Loop 120 is in turn welded and secured to a stretcher support arm 124 extending rearwardly intermediate wheels 44 and 48. Arm 124 is adjustably supported within a tube 126 mounted on a support plate 128 (FIGS. 3 and 10). Plate 128 is secured to a positioning cylinder 130 slidably mounted on a cylinder 129 which is welded to beam 39 and houses support leg 39a. Set screws extend through cylinder 130 to allow the vertical position of cylinder 130 and thus arm 124 in loop 120 to be adjusted to a proper position. The position of rigid stretching loop 120, as shown in FIGS. 12a and 12b, is such that as the cutting of the incision in the fowl neck is being completed, a section of blade 90 and neck-support member 58 remain in engagement with the neck and move past and below the neck-engaging portion 122 of the loop 120. Because loop 120 is stationary, and the neck is being moved therepast and therebelow and is simultaneously being held by shackle 29 which moves in registry with the holding and positioning carriage assembly 40, the neck is stretched such that the incision is opened and the neck vertebrae are separated allowing access to the windpipe, esophagus and crop of the fowl. A worker standing down line from the neck-cutting and breaking apparatus 10 can thereafter utilize one of his fingers to insert within the incision and pull out the aforementioned parts. The neck-engaging portion 122 of loop 120 is positioned at an angle to the path of the fowl such that the fowl neck will slide around the rounded end of the loop and continue onwardly along the path of travel of the conveyor as the cutting blade section and neck-support members are disengaged by their divergent rotational paths beneath the stationary stretching member. A guide bar 132 may be provided adjacent stretching arm 124 and supported by plate 128 to ensure that the fowl continue on the proper course of travel after having their necks cut, broken and stretched as described above.

A series of spray nozzles 140 connected to a source of pressurized water are positioned at various locations about the circumference of the holding and positioning carriage assembly 40 as well as adjacent the cutting apparatus 70. Nozzles 40 continuously spray apparatus 10 to clean the same such that the holding and positioning carriage 40 and the cutting blade 90 are cleaned before engagement with each successive fowl on the conveyor line. A cover 150 of sheet metal or the like may be provided around the apparatus as shown in various of the figures to protect those working around the apparatus and to prevent dirt and other contaminating materials from entering the machinery.

OPERATION AND METHOD

The neck-cutting, breaking and stretching operation will now be apparent. A series of previously cleaned and picked poultry or other fowl are positioned in an inverted manner by their hocks on shackles 29 on conveyor 12 upstream from the processing apparatus 10 of the present invention. The conveyor chain 24 is driven by sprocket 22 around the semicircular loop 14 beneath which the processing apparatus is positioned. Each of the suspended, inverted fowl, hanging with its neck down from shackles 29, are guided by guide bar 66 and one of the guide fingers 59 into registry with one of the notches 46 in guide wheel 44. As carriage 40 begins the semicircular path of travel evident in FIG. 3, the above positioning brings the neck of the fowl into registry and vertical alignment with one of the forks 55 between the extending prongs 56 thereof which are still in their lower position. As the shackle is moved further around guide bar 66 in registry with the holding and positioning apparatus, the forks successively engage the inclined ramp portion of cam track 64 and are raised such that the neck of the fowl is encompassed by and restrained between the extending prongs immediately ahead of the cutting position. Simultaneously, the rotational movement of main shaft 42 is transferred to cutting blade 90 via drive chains 104, 112 and shaft 72 such that the cutting blade is rotated oppositely to the direction of rotation of the holding and positioning carriage assembly.

Continued movement brings one of the cutting edges 91 of cutting blade 90 into engagement with the neck of the fowl behind the leading wing which is moved out of the way by positioning disc 92. The neck is pressed against the edges of flanges 58b and 58c spaced above and below blade 90 by the cutting edge. The relatively faster rate of rotation of cutting blade 90 begins to cut the neck of the fowl to a controlled depth and simultaneously breaks the neck vertebra of the fowl. Continued rotation completes the cutting of the neck and brings the neck into engagement with the neck-engagement portion 122 of the rigid stretching loop 120 as shown in FIGS. 12a and 12b. The blade 90 and neck support member 58 retain engagement with the fowl neck as the continuous movement of the fowl in its path of travel stretches the neck between the cutting blade and support member and the shackle 29 and over the rigid loop 120. Thereafter, the cutting blade diverges from the neck-support member, releasing the neck and allowing it to pass around the corner or end of the stretching member and continue on down the conveyor line where the windpipe, esophagus and crop may be manually or otherwise removed. The continuously rotated apparatus is thereafter sprayed with water from nozzles 140 to clean the same before engagement with another fowl being transported by the overhead conveyor.

As will be appreciated, the above apparatus accomplishes a method for processing poultry wherein an incision is cut to a controlled depth in the neck of a fowl while the neck vertebra of the fowl are broken. The cutting and breaking is accomplished while moving the fowl along a predetermined path while at least the neck of the fowl is being positioned for such cutting and breaking. After the cutting and breaking, the neck is then stretched with a stationary stretching member to open the incision and separate the neck bone while the fowl is continuously moved along the path of travel of the conveyor.

As shown in the figures and described above, the fowl is held and positioned with its back outward such that the incision and breaking occurs from the back of the neck to avoid severance or cutting of the windpipe, esophagus and crop. The cutting blade is preferably moved against the neck while the neck is being supported on its opposite side by a neck support member having flanges which are spaced above and below the level or position of the cutting blade section. Preferably, the cutting blade is rotated at a speed in the range of two to three times as fast as the speed of movement of the holding and positioning apparatus and thus the fowl neck so as to provide a slitting action across the neck ensuring a proper and efficient cutting and breaking of the neck. At the time of the cutting, the wings of the fowl, which may otherwise interfere with proper cutting of the neck, are positioned away from the cutting blade by a positioning disc which pushes them out and away from the body and neck of the fowl. After the above cutting steps, the engagement of the blade and neck-support member is maintained as the neck, shackle, cutting blade and neck support member are moved past the stationary stretching member so as to stretch the neck over that member to open the incision and separate the neck bone to allow access to the windpipe, esophagus and crop.

The above method is preferably accomplished with a blade having separate arcuate cutting edges such that the leading edge of each section will engage the neck of a fowl behind the leading wing of the fowl and finish its cutting operation or stroke ahead of the trailing wing of the fowl. Of course, the above apparatus and method may be applied to different sizes of fowl by adjusting the position of the cutting blade 90 and shaft 72, stretching member 120, guide wheel 44 as well as wheel 48, columns 30a, 30b, and cam 60. The length of shackles 29 can also be changed. The smooth, cooperating rotational movement of the holding and positioning carriage assembly and the juxtaposed, oppositely rotating cutting blade cleanly and efficiently cut and break the necks of successive fowl while providing a relatively maintenance-free apparatus which is durable and long lasting.

Preferably, as many parts as possible of the above-described apparatus are formed from stainless steel or plastic so as to be noncorrosive. The continuous washing with spray nozzles 140 will thus have little or no damaging effect on the apparatus.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. Poultry processing apparatus for cutting and breaking the necks of fowl comprising movable support means for suspending and moving at least one fowl along a path in an inverted position with its neck down; holding means for positioning at least the neck of a fowl; cutting means for cutting an incision partially through the neck of said fowl to a controlled depth and breaking the bone in said neck; said holding means being movable along a portion of and adjacent to said path and synchronized with said movable support means; said cutting means also being movable along and adjacent to at least a portion of said path; stationary stretching means for engaging the fowl neck and stretching and opening said incision and separating the bone in said fowl neck, said stationary stretching means including a rigid member positioned generally transverse to said path of the fowl and generally transverse to the neck of the fowl, whereby said apparatus prepares said fowl neck for withdrawal of its windpipe, esophagus and crop through said incision.

2. The apparatus of claim 1 wherein said stretching means is spaced from and out of contact with said cutting means and holding means; said apparatus including means for moving said cutting means and holding means with respect to said stretching means during contact with said fowl neck such that the fowl neck is forced against said rigid member to open the incision and separate the bone in the fowl neck.

3. The apparatus of claim 1 wherein said holding means includes first movable holding means for positioning and restraining at least the neck of a fowl suspended from said movable support means; said movable cutting means opposing and in close proximity to said first movable holding means for at least a portion of the length of the path of travel of said first movable holding means for controlled cutting of said neck incision and breaking said neck bone; and drive means for moving said first movable holding means and said movable cutting means in synchronism with one another and with said movable support means.

4. The apparatus of claim 3 wherein said drive means include means for moving said first movable holding means, said movable cutting means, and said movable support means in curved paths.

5. The apparatus of claim 3 wherein said drive means include means for moving said movable cutting means at a speed in the range of about two to three times faster than the speed of said first movable holding means and movable support means whereby controlled cutting of said neck is facilitated.

6. The apparatus of claim 3 wherein said holding means further includes second movable holding means spaced vertically from said first movable holding means for positioning and restraining another portion of said fowl while said first movable holding means positions and restrains said fowl neck.

7. The apparatus of claim 6 wherein said movable cutting means includes a rotary cutting blade with its cutting edge being rotated in close proximity to said first movable holding means by said drive means, and a positioning member spaced vertically from and rotated in unison with said cutting blade for positioning the wings of said fowl away from said cutting blade during cutting and cooperating with said first movable holding means to restrain said fowl neck during cutting.

8. The apparatus of claim 6 wherein said rigid stretching member is positioned intermediate said first and second movable holding means and extends generally transverse to the paths of travel of said first movable holding means and said movable cutting means whereby said fowl neck is engaged and stretched by said stretching member to open said incision and separate said neck bone while said first movable holding means and said movable cutting means remain in engagement with the fowl neck and are moved past said stretching member.

9. The apparatus of claim 3 wherein said first movable holding means includes a support having a circular circumference and restraining means on said support for restraining and positioning said fowl neck during cutting and stretching; said movable cutting means including a rotary cutting blade opposing said circular support and restraining means; said movable support means including an overhead conveyor extending along a curved path generally parallel to and vertically aligned with said circular support and suspension means movable along said conveyor for suspending fowl in alignment with said circular support and restraining means.

10. The apparatus of claim 9 wherein said restraining means include at least one vertically pivotable fork having a pair of prongs with a fowl neck-receiving space therebetween, a fowl neck-support member extending across said fork generally transverse to said prongs, and a stationary cam having a varying vertical height supporting said fork from beneath, said cam extending in a path generally parallel to and vertically aligned with said circular support, said fork being pivotable by said cam as said circular support is moved between a raised position in which said fowl neck-support member is positioned against said circular circumference of said support and said prongs extend outwardly beyond said circumferential surface of said circular support on either side of a fowl neck with said neck positioned against said fowl neck-support member and a lowered position wherein said fork extends downwardly from said circular support and does not engage or position a fowl neck.

11. The apparatus of claim 10 wherein said circular support is a disc, said fork prongs being a leading prong and a trailing prong relative to the direction of movement of said disc, said fork being pivotally secured to the bottom of said disc such that said fork pivots in a vertical plane passing through a radius of said disc; said disc including a projection secured to its top surface, said projection being generally aligned with and spaced vertically above the trailing prong of said fork and extending beyond said circumferential surface of said disc to guide the fowl into position within the fowl neck-receiving space of said fork.

12. The apparatus of claim 10 wherein said fowl neck-support member is a generally U-shaped channel having a bottom wall and side flanges opening toward said rotary cutting blade, said blade extending into said channel such that said channel side flanges extend on either side of, are spaced from, and overlap said cutting blade, said bottom wall engaging said circumference of said circular support when said fork is in its raised position.

13. The apparatus of claim 10 wherein said rotary cutting blade includes a plurality of separate cutting blade sections extending outwardly from a central section with wedge-shaped portions removed between said sections, each section including an arcuate cutting edge; said first movable holding means including a plurality of said vertically pivotable forks spaced around said circular support; said drive means driving said cutting blade such that its cutting edges travel at a speed generally in the range of about two to three times faster than the circumferential speed of said circular support to provide a slitting action against a fowl neck.

14. The apparatus of claim 9 further including a guide wheel spaced vertically above and movable in unison with said circular support, said wheel including at least one recess in its circumference for receiving and guiding another portion of said fowl when its neck is positioned and restraining by said circular support and restraining means.

15. The apparatus of claim 1 including a suspended framework for supporting said movable cutting means, holding means and stretching means beneath and in cooperation with said movable support means, said framework including only a single leg engaging a supporting surface for stabilizing said framework.

16. Poultry processing apparatus for cutting and breaking the necks of fowl comprising movable support means for suspending at least one fowl in an inverted position with its neck down; holding means for positioning at least the neck of a fowl; cutting means for cutting an incision partially through the neck of the fowl to a controlled depth and breaking the bone in the neck; said holding means and cutting means being movable and positioned adjacent to and synchronized with said movable support means; stationary stretching means positioned adjacent said cutting means and holding means for engaging the fowl neck and stretching and opening said incision and separating the bone in said fowl neck whereby said apparatus prepares said fowl neck for withdrawal of its windpipe, esophagus and crop through said incision; said stretching means is spaced from and out of contact with said cutting means and holding means; said apparatus including means for moving said cutting means and holding means with respect to said stretching means during contact with said fowl neck such that the fowl neck is forced against said stretching means to open the incision and separate the bone in the fowl neck; said holding means including first movable holding means for positioning and restraining at least the neck of a fowl suspended from said movable support means; said movable cutting means opposing and in close proximity to said first movable holding means for at least a portion of the length of the path of travel of said first movable holding means for controlled cutting of said neck incision and breaking said neck bone; and said means for moving said cutting means and holding means including drive means for moving said first movable holding means and said movable cutting means in synchronism with one another and with said movable support means; said first movable holding means including a support having a circular circumference and restraining means on said support for restraining and positioning said fowl neck during cutting and stretching; said movable cutting means including a rotary cutting blade opposing said circular support and restraining means; said movable support means including an overhead conveyor extending along a curved path generally parallel to and vertically aligned with said circular support and suspension means movable along said conveyor for suspending fowl in alignment with said circular support and restraining means; a guide wheel spaced vertically above and movable in unison with said circular support, said wheel including at least one recess in its circumference for receiving and guiding another portion of said fowl when its neck is positioned and restraining by said circular support and restraining means; said stretching means including an arm extending between said guide wheel and circular support and arm support means for supporting said arm including means for adjusting the position of said arm; said arm including a rigid loop extending from its end and positioned above the area at which said circular support and cutting blade are in close proximity for engaging and stretching said fowl neck.

17. The apparatus of claim 16 wherein said movable cutting means also includes a positioning disc spaced vertically below and rotatable in unison with said rotary cutting blade for engaging said fowl and positioning the wings of said fowl away from said cutting blade during cutting.

18. Poultry processing apparatus for cutting and breaking the necks of fowl comprising holding means for positioning and restraining at least the neck of a fowl, said holding means including a plurality of positioning means for positioning individual fowl for cutting; rotary cutting means including a rotary cutting blade positioned in opposition to said holding means for controlled cutting of an incision partially through said fowl neck and for breaking the bone in said neck, said cutting blade having separate cutting blade sections separated by open spaces therebetween; synchronized means for moving said holding means including said positioning means in a predetermined path and for rotating said cutting means, said cutting blade being rotated such that a cutting blade section is in registry with and in close proximity to each of said positioning means as said holding means is moved by said synchronized means whereby said fowl neck is cut and prepared for removal of the windpipe, esophagus and crop through said incision by one of said blade sections while other portions of the fowl such as its wings are received in said open spaces to prevent cutting or damage to said other fowl portions.

19. The apparatus of claim 18 wherein each of said positioning means include means for positioning and restraining one of said fowl at at least two generally vertically spaced positions.

20. The apparatus of claim 19 including means for suspending and moving the fowl with their necks down; said holding means and positioning means including two vertically spaced, circular wheels mounted for rotation in unison with one another, one wheel including a plurality of recesses in its circumference, each of said recesses adapted to position and guide a portion of a suspended fowl, the other wheel including a plurality of vertically pivotable, fowl-restraining forks, each fork including a pair of prongs defining a fowl neck-receiving space therebetween and being pivotable between a raised fowl neck-restraining position wherein said prongs extend on either side of a fowl neck and a lowered position out of engagement with a fowl neck; each of said recesses in said one wheel being vertically aligned with one of said forks whereby said recesses and forks remain in alignment as said wheels are rotated in unison; means for raising said forks prior to the location at which said rotary cutting blade is in close proximity to said holding means and thereafter lowering said forks as said wheels rotate.

21. The apparatus of claim 20 wherein said means for raising and lowering said forks include a cam positioned beneath and generally in alignment with the circumference of said other wheel, said cam having a varying height whereby said forks are raised and lowered as said other wheel is rotated.

22. The apparatus of claim 20 including a fowl neck-support member extending across the prongs of each of said forks, said fowl neck-support members each including means for engaging a fowl neck opposite said cutting blade at positions spaced on either side of said rotary cutting blade.

23. The apparatus of claim 22 wherein said fowl neck-support member is a generally U-shaped channel having a bottom wall and side flanges opening toward said rotary cutting blade, said blade extending into said channel such that said channel side flanges extend on either side of, are spaced from, and overlap said cutting blade, said bottom wall engaging said circumference of said other wheel when said fork is in its raised position.

24. The apparatus of claim 18 including a positioning wheel spaced below said cutting blade and mounted for rotation in unison with said blade for positioning the wings of the fowl away from said cutting blade during cutting.

25. The apparatus of claim 18 wherein said separate cutting blade sections extend outwardly from a central section with wedge-shaped portions removed between said sections to form said open spaces, said sections each including an arcuate cutting edge.

26. The apparatus of claim 18 including a stretching member positioned adjacent to and spaced from the location at which said cutting blade and positioning means are in close proximity such that it extends generally across the path of travel of a fowl neck positioned in said holding means during cutting with said cutting blade whereby said fowl neck is engaged and stretched by said stretching member to open said incision and separate said neck bone while said holding means and cutting blade engage said neck.

27. Poultry processing apparatus for cutting and breaking the necks of fowl comprising movable support means for suspending at least one fowl in an inverted position with its neck down; a support framework adjacent said movable support means; holding and positioning means supported on said framework for positioning and restraining said fowl suspended from said movable support means, said holding and positioning means including a circular, rotatable support having fowl engaging means at spaced locations thereon for engaging, holding and positioning individual fowl suspended from said movable support means, said fowl engaging means being moved in a circular path by rotation of said circular, rotatable support and moving said individually positioned fowl along at least a portion of said path; first means for moving said movable support means in a path generally parallel to at least a portion of said holding and positioning means and for moving said holding and positioning means; cutting means positioned on said framework in opposition and in close proximity to but spaced and separated from a predetermined location along said circular path of said circular, rotatable support for cutting an incision in said fowl neck to a controlled depth and for breaking the bone in said neck as the fowl are moved along the path, said path extending between said cutting means and said circular, rotatable support at said location; second means for moving said cutting means in timed, synchronized relation to said holding and positioning means such that said cutting means will engage the necks of fowl held by each of said fowl engaging means to make said incision and break said neck bone whereby said fowl is prepared for withdrawal of its windpipe, esophagus and crop.

28. The apparatus of claim 27 wherein said cutting means includes a rotary cutting blade having a plurality of separate cutting blade sections extending outwardly from a central section with wedge-shaped portions removed from between said sections, said sections each including an arcuate cutting edge.

29. The apparatus of claim 28 including means for adjusting the distance of said cutting blade from said holding and positioning means.

30. The apparatus of claim 27 wherein said first means include an overhead conveyor track formed in the shape of at least a partial circle with a diameter approximately the same as that of said circular/rotatable support of said holding means; said movable support means including trolley means movably mounted on said conveyor track for supporting said fowl; said first means also including a drive means for driving said trolley means.

31. The apparatus of claim 30 wherein said holding and positioning means is mounted on a first rotatable shaft driven by said drive means; said cutting means including a rotary cutting blade mounted on a second rotatable shaft spaced from said first shaft, said second means including connecting means for drivingly connecting said first and second shafts to rotate the second from the first in timed relationship.

32. The apparatus of claim 31 wherein said connecting means include means for moving the cutting edges of said cutting blade at a speed in the range of about two to three times faster than said holding and positioning means at the said location of close proximity.

33. Poultry processing apparatus for cutting and breaking the necks of fowl comprising movable support means for suspending at least one fowl in an inverted position with its neck down; a support framework adjacent said movable support means; circular holding and positioning means supported on said framework for positioning and restraining said fowl suspended from said movable support means, said circular holding and positioning means including a rotatable support having fowl engaging means at spaced locations thereon for engaging, holding and positioning individual fowl suspended from said movable support means, said fowl engaging means being moved in a circular path by rotation of said rotatable support and moving said individually positioned fowl along at least a portion of said path; first means for moving said movable support means in a path generally parallel to at least a portion of said circular holding and positioning means and for moving said circular holding and positioning means; cutting means positioned on said framework in opposition and in close proximity to at least one location along said circular path of said rotatable support for cutting an incision in said fowl neck to a controlled depth and for breaking the bone in said neck as the fowl are moved along the path; second means for moving said cutting means in timed, synchronized relation to said holding and positioning means to make said incision and break said neck bone whereby said fowl is prepared for withdrawal of its windpipe, esophagus and crop; a stretching member positioned adjacent to and spaced from the said location at which said cutting means and circular holding and positioning means are in opposition and close proximity such that it extends generally across the path of travel of a fowl neck positioned in said circular holding and positioning means during cutting with said cutting means and transverse to the direction of elongation of the fowl neck being cut whereby said fowl neck is engaged and stretched by said stretching member to open said incision and separate said neck bone while said circular holding and positioning means and cutting means engage said neck.

34. Poultry processing apparatus for cutting and breaking the necks of fowl comprising movable support means for suspending at least one fowl in an inverted position with its neck down; a support framework adjacent said movable support means; circular holding and positioning means supported on said framework for positioning and restraining said fowl suspended from said movable support means, said circular holding and positioning means including a rotatable support having fowl engaging means at spaced locations thereon for engaging, holding and positioning individual fowl suspended from said movable support means, said fowl engaging means being moved in a circular path by rotation of said rotatable support and moving said individually positioned fowl along at least a portion of said path; first means for moving said movable support means in a path generally parallel to at least a portion of said circular holding and positioning means and for moving said circular holding and positioning means; cutting means positioned on said framework in opposition and in close proximity to at least one location along said circular path of said rotatable support for cutting an incision in said fowl neck to a controlled depth and for breaking the bone in said neck as the fowl are moved along the path; second means for moving said cutting means in timed, synchronized relation to said holding and positioning means to make said incision and break said neck bone whereby said fowl is prepared for withdrawal of its windpipe, esophagus and crop; said rotatable support including a first circular wheel; said circular holding and positioning means also including a second circular spaced vertically from said first wheel; said two vertically spaced, circular wheels mounted for rotation in unison with one another, said second wheel including a plurality of recesses in its circumference, each of said recesses adapted to position, restrain and guide a portion of a suspended fowl, said first wheel having said fowl engaging means which include a plurality of vertically pivotable, fowl-restraining forks, each fork including a pair of prongs defining a fowl neck-receiving space therebetween and being pivotable between a raised fowl neck-restraining position wherein said prongs extend on either side of a fowl neck and a lowered position out of engagement with a fowl neck; each of said recesses in said second wheel being vertically aligned with one of said forks whereby said recesses and forks remain in alignment as said wheels are rotated in unison; means for raising said forks prior to the location at which said cutting means is in close proximity to said holding means and thereafter lowering said forks as said wheels rotate.

35. The apparatus of claim 34 wherein said means for raising and lowering said forks include a cam positioned beneath and generally in alignment with the circuference of said other wheel, said cam having a varying height whereby said forks are raised and lowered as said first wheel is rotated.

36. The apparatus of claim 34 including a fowl neck support member extending across the prongs of each of said forks, said fowl neck-support members each including means for engaging a fowl neck opposite said cutting means at positions spaced on either side of said cutting means.

37. Poultry processing apparatus for cutting and breaking the necks of fowl comprising movable support means for suspending at least one fowl in an inverted position with its neck down; a support framework adjacent said movable support means; circular holding and positioning means supported on said framework for positioning and restraining said fowl suspended from said movable support means, said circular holding and positioning means including a rotatable support having fowl engaging means at spaced locations thereon for engaging, holding and positioning individual fowl suspended from said movable support means, said fowl engaging means being moved in a circular path by rotation of said rotatable support and moving said individually positioned fowl along at least a portion of said path; first means for moving said movable support means in a path generally parallel to at least a portion of said circular holding and positioning means and for moving said circular holding and positioning means; cutting means positioned on said framework in opposition and in close proximity to at least one location along said circular path of said rotatable support for cutting an incision in said fowl neck to a controlled depth and for breaking the bone in said neck as the fowl are moved along the path; second means for moving said cutting means in timed, synchronized relation to said holding and positioning means to make said incision and break said neck bone whereby said fowl is prepared for withdrawal of its windpipe, esophagus and crop; said cutting means includes a rotary cutting blade having a plurality of separate cutting blade sections extending outwardly from a central section with wedge-shaped portions removed from between said sections, said sections each including an arcuate cutting edge; a positioning wheel spaced below said cutting blade and mounted for rotation in unison with said blade for positioning the wings of the fowl away from said cutting blade during cutting.

38. Poultry processing apparatus for cutting and breaking the necks of fowl comprising movable support means for suspending and moving at least one fowl along a path in an inverted position with its neck down; holding means for positioning at least the neck of a fowl; cutting means positioned adjacent said path for cutting an incision partially through the neck of said fowl to a controlled depth and breaking the bone in said neck; said holding means being movable along a portion of and adjacent to said path; a stationary, rigid, stretching loop positioned adjacent said cutting means and said holding means for engaging the fowl neck and stretching and opening said incision and separating the bone in said fowl neck whereby said apparatus prepares said fowl neck for withdrawal of its windpipe, esophagus and crop through said incision.

* * * * *

UNITED STATES PATENT AND TRADEMARK OFFICE
CERTIFICATE OF CORRECTION

PATENT NO. : 4,091,503
DATED : May 30, 1978
INVENTOR(S) : Gaston M. Fox, Thomas H. Wright It is certified that error appears in the above-identified patent and that said Letters Patent are hereby corrected as shown below:

Column 1, line 29
"Patent No. 3,965,534" should be -- Patent 3,965,534

Column 15, line 39
"circular/rotatable" should be -- circular, rotatable --

Column 16, line 62
insert -- wheel -- before "spaced"

Column 17, line 17
"said other wheel" should be -- said first wheel --

Signed and Sealed this

Fifteenth Day of May 1979

[SEAL]

Attest:

RUTH C. MASON
Attesting Officer

DONALD W. BANNER
Commissioner of Patents and Trademarks